(12) United States Patent
Raichelgauz et al.

(10) Patent No.: US 9,489,431 B2
(45) Date of Patent: Nov. 8, 2016

(54) SYSTEM AND METHOD FOR DISTRIBUTED SEARCH-BY-CONTENT

(71) Applicant: CORTICA, LTD., Ramat Gan (IL)

(72) Inventors: Igal Raichelgauz, Ramat Gan (IL); Karina Odinaev, Ramat Gan (IL); Yehoshua Y. Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 290 days.

(21) Appl. No.: 14/096,802

(22) Filed: Dec. 4, 2013

(65) Prior Publication Data

US 2014/0095494 A1    Apr. 3, 2014

Related U.S. Application Data

(63) Continuation-in-part of application No. 13/624,397, filed on Sep. 21, 2012, now Pat. No. 9,191,626, which (Continued)

(30) Foreign Application Priority Data

Oct. 26, 2005  (IL) .......................... 171577
Jan. 29, 2006  (IL) .......................... 173409
Aug. 21, 2007  (IL) .......................... 185414

(51) Int. Cl.
*G06G 5/00* (2006.01)
*G06F 1/00* (2006.01)
(Continued)

(52) U.S. Cl.
CPC ... *G06F 17/30554* (2013.01); *G06F 17/30023* (2013.01); *H04H 60/37* (2013.01);
(Continued)

(58) Field of Classification Search
CPC .......... G06N 5/04; G06N 5/02; G06N 5/022; G06Q 50/01
See application file for complete search history.

(56) References Cited

U.S. PATENT DOCUMENTS 4,972,363 A    11/1990  Nguyen et al.
5,806,061 A     9/1998  Chaudhuri et al.
(Continued)

FOREIGN PATENT DOCUMENTS

WO         02/31764      4/2002
WO        2007/049282    5/2007

OTHER PUBLICATIONS

Foote, Jonathan, et al. "Content-Based Retrieval of Music and Audio", 1997 Institute of Systems Science, National University of Singapore, Singapore (Abstract).

(Continued)

*Primary Examiner* — Stanley K Hill
*Assistant Examiner* — Kalpana Bharadwaj
(74) *Attorney, Agent, or Firm* — M&B IP Analysts, LLC

(57) ABSTRACT

A method for conducting search-by-content is provided. The method includes responsive to an input multimedia content item provided to a user device, checking if the input multimedia content item matches at least one concept of a plurality of concepts cached in the user device; retrieving characteristics set for a user of the user device; performing a search, using the at least one matching concept, for multimedia content items similar to the input multimedia content item; determining which of the search results are of interest to the user based on the characteristics set for the user; and saving results that are of interest to the user in the user device, wherein the saved results include multimedia content items.

21 Claims, 4 Drawing Sheets

Related U.S. Application Data is a continuation-in-part of application No. 13/344,400, filed on Jan. 5, 2012, now Pat. No. 8,959,037, which is a continuation of application No. 12/434,221, filed on May 1, 2009, now Pat. No. 8,112,376, said application No. 13/624,397 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 13/624,397 is a continuation-in-part of application No. 12/084,150, filed as application No. PCT/IL2006/001235 on Oct. 26, 2006, now Pat. No. 8,655,801.

(60) Provisional application No. 61/773,837, filed on Mar. 7, 2013.

(51) Int. Cl.
  *G06F 17/30* (2006.01)
  *H04H 60/37* (2008.01)
  *H04N 7/173* (2011.01)
  *H04N 21/258* (2011.01)
  *H04N 21/2668* (2011.01)
  *H04N 21/466* (2011.01)
  *H04N 21/81* (2011.01)
  *H04H 60/47* (2008.01)
  *H04H 60/46* (2008.01)
  *H04H 60/58* (2008.01)
  *H04H 60/59* (2008.01)
  *H04H 60/65* (2008.01)
  *H04H 60/73* (2008.01)

(52) U.S. Cl.
  CPC ............ *H04H 60/46* (2013.01); *H04H 60/47* (2013.01); *H04H 60/58* (2013.01); *H04H 60/59* (2013.01); *H04H 60/65* (2013.01); *H04H 60/73* (2013.01); *H04N 7/17318* (2013.01); *H04N 21/25891* (2013.01); *H04N 21/2668* (2013.01); *H04N 21/466* (2013.01); *H04N 21/8106* (2013.01); *H04H 2201/90* (2013.01)

(56) References Cited

U.S. PATENT DOCUMENTS

| | | |
|---|---|---|
| 5,852,435 A | 12/1998 | Vigneaux et al. |
| 5,870,754 A | 2/1999 | Dimitrova et al. |
| 5,887,193 A | 3/1999 | Takahashi et al. |
| 5,978,754 A | 11/1999 | Kumano |
| 6,052,481 A | 4/2000 | Grajski et al. |
| 6,076,088 A | 6/2000 | Paik et al. |
| 6,122,628 A | 9/2000 | Castelli et al. |
| 6,128,651 A | 10/2000 | Cezar |
| 6,144,767 A | 11/2000 | Bottou et al. |
| 6,147,636 A | 11/2000 | Gershenson |
| 6,243,375 B1 | 6/2001 | Speicher |
| 6,381,656 B1 | 4/2002 | Shankman |
| 6,411,229 B2 | 6/2002 | Kobayashi |
| 6,422,617 B1 | 7/2002 | Fukumoto et al. |
| 6,524,861 B1 | 2/2003 | Anderson |
| 6,594,699 B1 | 7/2003 | Sahai et al. |
| 6,611,628 B1 | 8/2003 | Sekiguchi et al. |
| 6,618,711 B1 | 9/2003 | Ananth |
| 6,643,620 B1 | 11/2003 | Contolini et al. |
| 6,643,643 B1 | 11/2003 | Lee et al. |
| 6,665,657 B1 | 12/2003 | Dibachi |
| 6,751,363 B1 | 6/2004 | Natsev et al. |
| 6,751,613 B1 | 6/2004 | Lee et al. |
| 6,754,435 B2 | 6/2004 | Kim |
| 6,763,519 B1 | 7/2004 | McColl et al. |
| 6,774,917 B1 | 8/2004 | Foote et al. |
| 6,804,356 B1 | 10/2004 | Krishnamachari |
| 6,819,797 B1 | 11/2004 | Smith et al. |
| 6,845,374 B1 | 1/2005 | Oliver et al. |
| 6,901,207 B1 | 5/2005 | Watkins |
| 7,006,689 B2 | 2/2006 | Kasutani |
| 7,013,051 B2 | 3/2006 | Sekiguchi et al. |
| 7,020,654 B1 | 3/2006 | Najmi |
| 7,043,473 B1 | 5/2006 | Rassool et al. |
| 7,047,033 B2 | 5/2006 | Wyler |
| 7,199,798 B1 | 4/2007 | Echigo et al. |
| 7,260,564 B1 | 8/2007 | Lynn et al. |
| 7,277,928 B2 | 10/2007 | Lennon |
| 7,302,117 B2 | 11/2007 | Sekiguchi et al. |
| 7,313,805 B1 | 12/2007 | Rosin et al. |
| 7,340,458 B2 | 3/2008 | Vaithilingam et al. |
| 7,353,224 B2 | 4/2008 | Chen et al. |
| 7,376,672 B2 | 5/2008 | Weare |
| 7,376,722 B1 | 5/2008 | Sim et al. |
| 7,433,895 B2 | 10/2008 | Li et al. |
| 7,464,086 B2 | 12/2008 | Black et al. |
| 7,526,607 B1 | 4/2009 | Singh et al. |
| 7,536,417 B2 | 5/2009 | Walsh et al. |
| 7,574,668 B2 | 8/2009 | Nunez et al. |
| 7,577,656 B2 | 8/2009 | Kawai et al. |
| 7,660,737 B1 | 2/2010 | Lim et al. |
| 7,694,318 B2 | 4/2010 | Eldering et al. |
| 7,697,791 B1 | 4/2010 | Chan et al. |
| 7,769,221 B1 | 8/2010 | Shakes et al. |
| 7,788,132 B2 | 8/2010 | Desikan et al. |
| 7,836,054 B2 | 11/2010 | Kawai et al. |
| 7,860,895 B1 | 12/2010 | Scofield et al. |
| 7,904,503 B2 | 3/2011 | Van De Sluis |
| 7,920,894 B2 | 4/2011 | Wyler |
| 7,921,107 B2 | 4/2011 | Chang et al. |
| 7,974,994 B2 | 7/2011 | Li et al. |
| 7,987,194 B1 | 7/2011 | Walker et al. |
| 7,991,715 B2 | 8/2011 | Schiff et al. |
| 8,000,655 B2 | 8/2011 | Wang et al. |
| 8,036,893 B2 | 10/2011 | Reich |
| 8,098,934 B2 | 1/2012 | Vincent et al. |
| 8,266,185 B2 | 9/2012 | Raichelgauz et al. |
| 8,312,031 B2 | 11/2012 | Raichelgauz et al. |
| 8,316,005 B2 | 11/2012 | Moore |
| 8,326,775 B2 | 12/2012 | Raichelgauz et al. |
| 8,655,801 B2 | 2/2014 | Raichelgauz et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,868,619 B2 | 10/2014 | Raichelgauz et al. |
| 8,880,539 B2 | 11/2014 | Raichelgauz et al. |
| 8,880,566 B2 | 11/2014 | Raichelgauz et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,330,189 B2 | 5/2016 | Raichelgauz et al. |
| 2001/0019633 A1 | 9/2001 | Tenze et al. |
| 2001/0056427 A1 | 12/2001 | Yoon et al. |
| 2002/0059580 A1 | 5/2002 | Kalker et al. |
| 2002/0087530 A1 | 7/2002 | Smith et al. |
| 2002/0107827 A1 | 8/2002 | Benitez-Jimenez et al. |
| 2002/0123928 A1* | 9/2002 | Eldering ............... G06Q 30/02 705/14.52 |
| 2002/0126872 A1 | 9/2002 | Brunk et al. |
| 2002/0143976 A1 | 10/2002 | Barker et al. |
| 2002/0163532 A1 | 11/2002 | Thomas et al. |

(56) References Cited

U.S. PATENT DOCUMENTS

| | | |
|---|---|---|
| 2002/0178410 A1 | 11/2002 | Haitsma et al. |
| 2003/0028660 A1 | 2/2003 | Igawa et al. |
| 2003/0041047 A1 | 2/2003 | Chang et al. |
| 2003/0078766 A1 | 4/2003 | Appelt et al. |
| 2003/0086627 A1 | 5/2003 | Berriss et al. |
| 2003/0126147 A1 | 7/2003 | Essafi et al. |
| 2003/0182567 A1* | 9/2003 | Barton .................. H04H 60/27 713/193 |
| 2003/0191764 A1 | 10/2003 | Richards |
| 2003/0200217 A1 | 10/2003 | Ackerman |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2005/0144455 A1 | 6/2005 | Haitsma |
| 2005/0177372 A1 | 8/2005 | Wang et al. |
| 2006/0013451 A1 | 1/2006 | Haitsma |
| 2006/0020860 A1 | 1/2006 | Tardif et al. |
| 2006/0026203 A1 | 2/2006 | Tan et al. |
| 2006/0031216 A1 | 2/2006 | Semple et al. |
| 2006/0048191 A1 | 3/2006 | Xiong |
| 2006/0064037 A1 | 3/2006 | Shalon et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0248558 A1 | 11/2006 | Barton et al. |
| 2006/0253423 A1 | 11/2006 | McLane et al. |
| 2007/0042757 A1 | 2/2007 | Jung et al. |
| 2007/0067682 A1 | 3/2007 | Fang |
| 2007/0071330 A1 | 3/2007 | Oostveen et al. |
| 2007/0074147 A1 | 3/2007 | Wold |
| 2007/0130159 A1 | 6/2007 | Gulli et al. |
| 2007/0168413 A1 | 7/2007 | Barletta et al. |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0294295 A1 | 12/2007 | Finkelstein et al. |
| 2008/0040277 A1 | 2/2008 | DeWitt |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0163288 A1 | 7/2008 | Ghosal et al. |
| 2008/0165861 A1 | 7/2008 | Wen et al. |
| 2008/0201299 A1 | 8/2008 | Lehikoinen et al. |
| 2008/0201314 A1 | 8/2008 | Smith et al. |
| 2008/0204706 A1 | 8/2008 | Magne et al. |
| 2008/0253737 A1 | 10/2008 | Kimura et al. |
| 2008/0270373 A1 | 10/2008 | Oostveen et al. |
| 2008/0313140 A1 | 12/2008 | Pereira et al. |
| 2009/0013414 A1 | 1/2009 | Washington et al. |
| 2009/0089587 A1 | 4/2009 | Brunk et al. |
| 2009/0119157 A1 | 5/2009 | Dulepet |
| 2009/0125529 A1 | 5/2009 | Vydiswaran et al. |
| 2009/0148045 A1 | 6/2009 | Lee et al. |
| 2009/0172030 A1 | 7/2009 | Schiff et al. |
| 2009/0175538 A1 | 7/2009 | Bronstein et al. |
| 2009/0204511 A1 | 8/2009 | Tsang |
| 2009/0216639 A1 | 8/2009 | Kapczynski et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0277322 A1 | 11/2009 | Cai et al. |
| 2010/0023400 A1 | 1/2010 | Dewitt |
| 2010/0042646 A1 | 2/2010 | Raichelgauz et al. |
| 2010/0082684 A1 | 4/2010 | Churchill et al. |
| 2010/0088321 A1 | 4/2010 | Solomon et al. |
| 2010/0104184 A1 | 4/2010 | Bronstein et al. |
| 2010/0106857 A1 | 4/2010 | Wyler |
| 2010/0162405 A1 | 6/2010 | Cook et al. |
| 2010/0173269 A1 | 7/2010 | Puri et al. |
| 2010/0191567 A1 | 7/2010 | Lee et al. |
| 2010/0268524 A1 | 10/2010 | Nath et al. |
| 2010/0306193 A1 | 12/2010 | Pereira et al. |
| 2010/0318493 A1 | 12/2010 | Wessling |
| 2010/0322522 A1 | 12/2010 | Wang et al. |
| 2011/0035289 A1 | 2/2011 | King et al. |
| 2011/0052063 A1 | 3/2011 | Mcauley et al. |
| 2011/0055585 A1 | 3/2011 | Lee |
| 2011/0106782 A1 | 5/2011 | Ke et al. |
| 2011/0145068 A1 | 6/2011 | King et al. |
| 2011/0202848 A1 | 8/2011 | Ismalon |
| 2011/0208822 A1 | 8/2011 | Rathod |
| 2011/0246566 A1 | 10/2011 | Kashef et al. |
| 2011/0251896 A1 | 10/2011 | Impollonia et al. |
| 2011/0313856 A1 | 12/2011 | Cohen et al. |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0197857 A1 | 8/2012 | Huang et al. |
| 2012/0330869 A1 | 12/2012 | Durham |
| 2013/0031489 A1 | 1/2013 | Gubin et al. |
| 2013/0067035 A1 | 3/2013 | Amanat et al. |
| 2013/0086499 A1 | 4/2013 | Dyor et al. |
| 2013/0104251 A1 | 4/2013 | Moore et al. |
| 2013/0173635 A1 | 7/2013 | Sanjeev |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0147829 A1 | 5/2014 | Jerauld |
| 2015/0289022 A1 | 10/2015 | Gross |

OTHER PUBLICATIONS

Ribert et al. "An Incremental Hierarchical Clustering", Visicon Interface 1999, pp. 586-591.

Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.

Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.

Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.

Wang et al. "A Signature for Content-based Image Retrieval Using a Geometrical Transform", ACM 1998, pp. 229-234.

Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.

Guo et al, "AdOn: An Intelligent Overlay Video Advertising System", SIGIR, Boston, Massachusetts, Jul. 19-23, 2009.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

Semizarov et al. "Specificity of Short Interfering RNA Determined through Gene Expression Signatures", PNAS, 2003, pp. 6347-6352.

(56) References Cited

OTHER PUBLICATIONS

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Cernansky et al., "Feed-forward Echo State Networks"; Proceedings of International Joint Conference on Neural Networks, Montreal, Canada, Jul. 31-Aug. 4, 2005.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Freisleben et al., "Recognition of Fractal Images Using a Neural Network", Lecture Notes in Computer Science, 1993, vol. 6861, 1993, pp. 631-637.

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.

IPO Examination Report under Section 18(3) for corresponding UK application No. GB1001219.3, dated May 30, 2012.

IPO Examination Report under Section 18(3) for corresponding UK application No. GB1001219.3, dated Sep. 12, 2011.

Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Maass, W. et al.: "Computational Models for Generic Cortical Microcircuits", Institute for Theoretical Computer Science, Technische Universitaet Graz, Graz, Austria, published Jun. 10, 2003.

International Search Report for the corresponding International Patent Application PCT/IL2006/001235; Date of Mailing: Nov. 2, 2008.

Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.

Jaeger, H.: "The "echo state" approach to analysing and training recurrent neural networks", GMD Report, No. 148, 2001, pp. 1-43, XP002466251. German National Research Center for Information Technology.

Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.

Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

International Search Authority: "Written Opinion of the International Searching Authority" (PCT Rule 43bis.1) including International Search Report for International Patent Application No. PCT/US2008/073852; Date of Mailing: Jan. 28, 2009.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.

Boari et al, "Adaptive Routing for Dynamic Applications in Massively Parallel Architectures", 1995 IEEE, Spring 1995.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Garcia, "Solving the Weighted Region Least Cost Path Problem Using Transputers", Naval Postgraduate School, Monterey, California, Dec. 1989.

Mahdhaoui, et al, "Emotional Speech Characterization Based on Multi-Features Fusion for Face-to-Face Interaction", Universite Pierre et Marie Curie, Paris, France, 2009.

Marti, et al, "Real Time Speaker Localization and Detection System for Camera Steering in Multiparticipant Videoconferencing Environments", Universidad Politecnica de Valencia, Spain, 2011.

Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.

Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

Theodoropoulos et al, "Simulating Asynchronous Architectures on Transputer Networks", Proceedings of the Fourth Euromicro Workshop on Parallel and Distributed Processing, 1996. PDP '96.

Lin, et al., "Robust Digital Signature for Multimedia Authentication: A Summary", IEEE Circuits and Systems Magazine, 4th Quarter 2003, pp. 23-26.

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.

(56) References Cited

OTHER PUBLICATIONS

Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.

Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.

Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.

May et al., "The Transputer", Springer-Verlag, Berlin Heidelberg, 1989, teaches multiprocessing system.

Nam, et al., "Audio Visual Content-Based Violent Scene Characterization", Department of Electrical and Computer Engineering, Minneapolis, MN, 1998, pp. 353-357.

Vailaya, et al., "Content-Based Hierarchical Classification of Vacation Images," I.E.E.E.: Multimedia Computing and Systems, vol. 1, 1999, East Lansing, MI, pp. 518-523.

Wallet, et al., "Personalized Content Retrieval in Context Using Ontological Knowledge," IEEE Transactions on circuits and Systems for Video Technology, vol. 17, No. 3, Mar. 2007, pp. 336-346.

Whitby-Strevens, "The Transputer", 1985 IEEE, Bristol, UK.

Yanai, "Generic Image Classification Using Visual Knowledge on the Web," MM'03, Nov. 2-8, 2003, Tokyo, Japan, pp. 167-176.

Chuan-Yu Cho, et al., "Efficient Motion-Vector-Based Video Search Using Query by Clip", 2004, IEEE, Taiwan, pp. 1-4.

Gomes et al., "Audio Watermaking and Fingerprinting: For Which Applications?" University of Rene Descartes, Paris, France, 2003.

Ihab Al Kabary, et al., "SportSense: Using Motion Queries to Find Scenes in Sports Videos", Oct. 2013, ACM, Switzerland, pp. 1-3.

Jianping Fan et al., "Concept-Oriented Indexing of Video Databases: Towards Semantic Sensitive Retrieval and Browsing", IEEE, vol. 13, No. 7, Jul. 2004, pp. 1-19.

Shin-Fu Chang, et al., "VideoQ: A Fully Automated Video Retrieval System Using Motion Sketches", 1998, IEEE New York, pp. 1-2.

Wei-Te Li et al., "Exploring Visual and Motion Saliency for Automatic Video Object Extraction", IEEE, vol. 22, No. 7, Jul. 2013, pp. 1-11.

Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp 1-10.

\* cited by examiner

SYSTEM AND METHOD FOR DISTRIBUTED SEARCH-BY-CONTENT

CROSS-REFERENCE TO RELATED APPLICATIONS

This application claims the benefit of U.S. provisional application No. 61/773,837 filed on Mar. 7, 2013 and is a continuation-in-part (CIP) of U.S. patent application Ser. No. 13/624,397 filed on Sep. 21, 2012, now pending. The Ser. No. 13/624,397 application is a CIP of:

(a) U.S. patent application Ser. No. 13/344,400 filed on Jan. 5, 2012, now pending, which is a continuation of U.S. patent application Ser. No. 12/434,221, filed May 1, 2009, now U.S. Pat. No. 8,112,376;

(b) U.S. patent application Ser. No. 12/195,863, filed Aug. 21, 2008, now U.S. Pat. No. 8,326,775, which claims priority under 35 USC119 from Israeli Application No. 185414, filed on Aug. 21, 2007, and which is also a continuation-in-part of the below-referenced U.S. patent application Ser. No. 12/084,150; and, (c) U.S. patent application Ser. No. 12/084,150 having a filing date of Apr. 7, 2009, now allowed, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006.

All of the applications referenced above are herein incorporated by reference for all that they contain.

TECHNICAL FIELD

The present invention relates generally to the analysis of multimedia content.

BACKGROUND

The Internet, also referred to as the worldwide web (WWW), has become an enormous source for multimedia content. Such multimedia content is intended for display on a user device such as a personal computer (PC), a smart phone, and the like. The content may be searched by a user of the user device and can be displayed in response to search queries received from the user.

The use of search engines for multimedia content search is discussed in the related art. The search engines can search for specific content and provide recommendations of content that is similar to what has been requested by the user. Search engines typically index data items of the dataset (e.g., web pages, images, email messages, documents, etc.) and then try to match an input query to the indexed data items.

As an example, a conventional search engine technique for searching for images includes the analysis of an input image (query) to create a mathematical model based on shapes, lines, proportions, and colors of the query. The created model is matched against images already in indexed dataset. As part of the process of identifying the image and returning similar results, the engine also analyzes the text of a web page that the matching image is found in order to determine what the image is. However, the search for images is limited to images or similar contents displayed in websites. In addition, search engine techniques are limited to images, and only indexed images and web pages can be searched. Moreover, the returned similar results or recommendations provided by the search engines are not optimized based on the user preferences. Rather, the results or recommendations are only related to webpages that they appear in.

It would therefore be advantageous to provide a solution that would overcome the deficiencies of the prior art by optimizing the performance of the system while providing content to a user device.

SUMMARY

Certain exemplary embodiments include a method for conducting search-by-content. The method comprises responding to an input multimedia content item provided to a user device, checking if the input multimedia content item matches at least one concept of a plurality of concepts cached in the user device; retrieving characteristics set for a user of the user device; performing a search, using the at least one matching concept, for multimedia content items similar to the input multimedia content item; determining which of the search results are of interest to the user based on the characteristics set for the user; and saving results that are of interest to the user in the user device, wherein the saved results include multimedia content items.

Certain exemplary embodiments also include a method for search-by-content. The method comprises responsive to an input multimedia content item provided to a user device, generating at least one signature for the input multimedia content item; checking if the input multimedia content item matches at least one concept of a plurality of concepts cached in the user device; for each of the least one matching concepts, sending at least one signature and metadata of the matching concepts to a server configured to search for multimedia content items similar to the input multimedia content item; and saving results that are of interest to the user in the storage device, wherein the saved results include multimedia content items.

Certain exemplary embodiments also include a system for conducting search-by-content. The system comprises: a processor; a deep content classification (DCC) engine connected to the processor; a storage unit for caching a plurality of concepts; and a memory connected to the processor, wherein the memory contains instructions that, when executed by the processor, configure the system to: responsive to an input multimedia content item provided to a user device, check, by the DCC engine, if the input multimedia content item matches at least one concept of the plurality of concepts cached in the storage unit; retrieve characteristics set for a user of the user device; perform a search for multimedia content items similar to the input multimedia content item using the at least one matching concept; determine which of the search results are of interest to the user based on the characteristics set for the user; and save results that are of interest to the user in the storage unit, wherein the saved results include multimedia content items.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
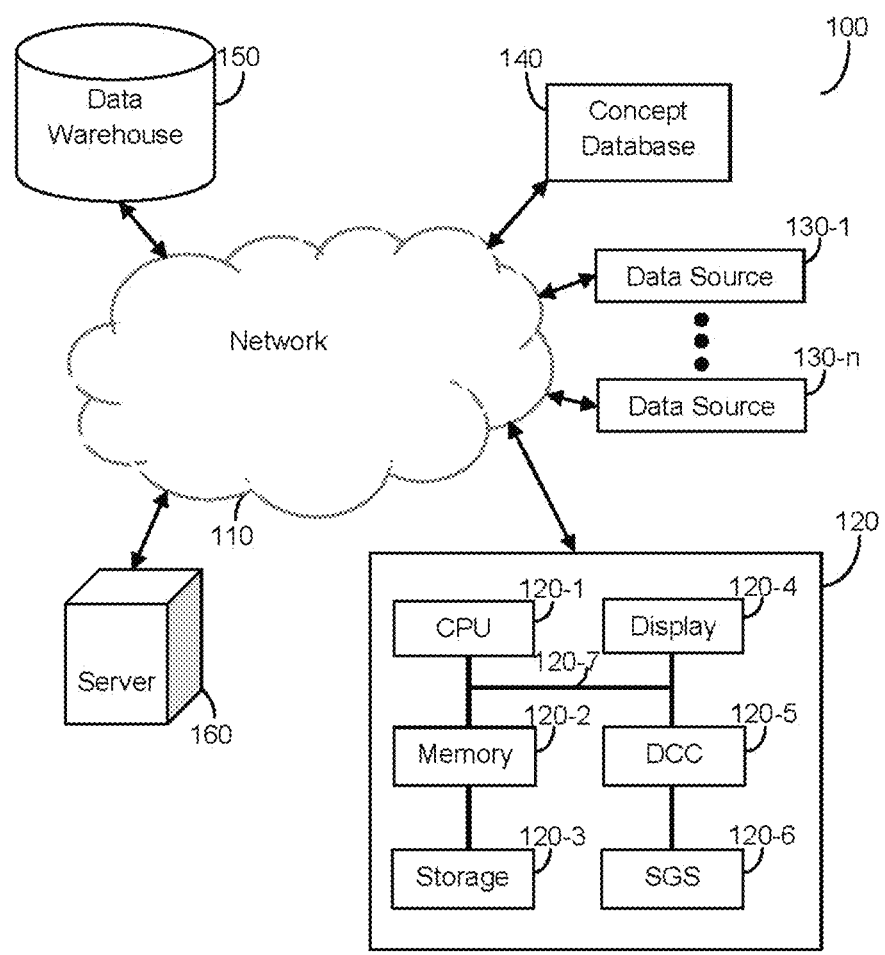
FIG. 1 is a schematic block diagram of a system utilized to describe the various disclosed embodiments.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for searching of multimedia content items similar to an input multimedia content item. The search is distributed between a user device and one or more data sources. In an embodiment, when an input multimedia content item is displayed over the user device or otherwise provided by a user of the user device, a local search is performed on the user device to find at least one concept of a plurality of concepts cached in the user device that matches the input multimedia content item. Thereafter, based on the matching concepts and characteristics of the user, a search of data sources is performed to find multimedia content items that coincide with characteristics designated in the user's characteristics. Data sources may include data warehouses that store multimedia content items, web sites, concept databases, and the like. As an example, the search can be performed in data warehouses that store scanned documents, X-ray images, photos, video clips, and the like.

FIG. 1 shows an exemplary and non-limiting schematic diagram of a system 100 utilized to describe the disclosed embodiments. The system 100 contains several components that are communicatively connected to a network 110. The network 110 may be the Internet, the world-wide-web (WWW), a local area network (LAN), a wide area network (WAN), a metro area network (MAN), and other networks capable of enabling communication between the components of the system 100.

The system 100 typically includes a user device 120. The user device 120 may be, but is not limited to, a personal computer (PC), a personal digital assistant (PDA), a mobile phone, a smart phone, a tablet computer, a laptop, a wearable computing device, or any kind of computing device equipped with browsing, viewing, listening, filtering, and managing capabilities that is enabled as further discussed herein below. It should be noted that the one user device 120 is illustrated in FIG. 1 only for the sake of simplicity and without limitation on the generality of the disclosed embodiments.

As further illustrated in FIG. 1, the user device 120 includes a processor or processing unit 120-1, a memory 120-2, a storage unit 120-3, and a display 120-4. The memory 120-2 contains instructions executable by the processor 120-1. The memory 120-2 may comprise volatile and/or non-volatile memory components, including but not limited to the like of Flash memory, static random access memory (SRAM), dynamic random access memory (DRAM), magnetic memory, and other tangible media on which data and/or instructions may be stored. According to an embodiment, the user device 120 includes a deep-content-classification (DCC) engine 120-5. The DCC engine 120-5 may be implemented as a hardware element in the user device 120, natively installed in a software/firmware agent in the user device 120, or a combination thereof.

The DCC engine 120-5 is configured to identify concepts that match an input multimedia content item. Optionally, the DCC engine 120-5 may also be configured to generate concept structures from multimedia content elements, or portions thereof stored in the storage unit 120-3. A concept is a collection of signatures representing a multimedia content element and metadata describing the concept. The collection is a signature reduced cluster generated by inter-matching the signatures generated for the many multimedia content elements, clustering the inter-matched signatures, and providing a reduced cluster set of such clusters. As a non-limiting example, a 'Superman concept' is a signature reduced cluster of signatures describing elements (such as multimedia content elements) related to, e.g., a Superman cartoon: a set of metadata including textual representations of the Superman concept.

Techniques for generating concepts and concept structures are also described in the U.S. Pat. No. 8,266,185 (hereinafter the '185 Patent) to Raichelgauz, et al., which is assigned to a common assignee, and is incorporated by reference herein for all that it contains. In an embodiment, the DCC engine 120-5 is configured and operates as the DCC system discussed in the '185 patent. It should be noted that as the DCC engine 120-5 operators one small subset of content items and concepts relatively to the system described in the '185 patent, the required computing resources for the operation of the DCC engine 120-5 are such that can be supported by the user device 120.

In an embodiment, the DCC engine 120-5 also includes or operates in conjunction with a signature generator system (SGS) 120-6. The SGS 120-6 may be installed natively as an agent on the user device 120. The process for generating signatures is explained in more detail herein above with respect to FIGS. 3 and 4. The various elements of the user device 120 are connected via a bus 120-7.

The storage unit 120-3 stores and caches a set of concepts related to a user of the user device 120. Such concepts may be generated by the DCC engine 120-5 based on multimedia content items or portions thereof stored in the storage unit 120-3 and/or concepts generated based on a large set of multimedia content items (as described, for example, in the '185 patent) and uploaded for caching on the user device 120. In one embodiment, the concepts uploaded to the storage unit 120-3 are related to one or more characteristics of the user of the user device 120. Such characteristics may include demographic information, user's preferences, and so on.

Also connected to the network 110 are a plurality of data sources 130-1 through 130-n. Such data sources may be, but are not limited to, web-sites, and systems, such as data warehouses, storage devices, databases, and the like that maintain multimedia content items. Examples of data sources 130-1 through 130-n are provided above. In an embodiment, a data source connected to the network 110 is a concept database 140 configured to maintain information such as at least one multimedia content item, signatures generated for multimedia content elements of the at least one multimedia content item, and concepts associated with the at least one multimedia content item. The concepts are searched through their respective signatures. An example of such a database can be found in U.S. patent application Ser.

No. 13/766,463 to Raichelgauz, et al., which is assigned to a common assignee, and is incorporated by reference herein for all that it contains.

Also connected to the network 110 is a data warehouse 150 configured to maintain one or more of the user's characteristics. The user's characteristic may be, but are not limited to, user interests, demographic information related to the user, and the like. The demographic information may be the age of the user, geographical location, time zone, the user's spoken language, and so on. It should be noted that the user's characteristics may be retrieved from the data warehouse 150 and/or received as a user input when the operation described below is executed.

According to the disclosed embodiments the content search method is initiated when a user views a multimedia content item on the display 120-4. The multimedia content item may be an image, a graphic, a video stream, a video clip, an audio stream, an audio clip, a video frame, a photograph, an image of signals, combinations thereof, and portions thereof.

In one embodiment, the DCC engine 120-5 is queried to determine if there is a match to at least one concept cached in the storage unit 120-3. The DCC engine 120-5 returns for each matching concept, a concept's signature (signature reduced cluster (SRC)) and the matching concept's metadata. A search is generated to find if at least one of the data sources 130 and the concept database 140 includes multimedia content items relevant to the metadata of the matching concept and/or the SRC. Specifically, in an exemplary embodiment, the data sources 130 are searched using metadata of a matching concept, while the concept database 140 is searched using the SRC of a matching concept. Since the metadata is a textual representation of the matching concept, the search of the data sources 130 is text-based. The search for relevant multimedia content items in the concept database 140 is performed by comparing the SRC to signatures utilized to index multimedia content items in the concept database 140. Two signatures are considered to be a match if they overlap in more than a predetermined threshold level.

In an embodiment, search results returned from the data sources 130-1 through 130-n and/or the concept database 140 are further processed by the user device 120 to filter results that do not coincide with the user's characteristics to detect primarily results that are of interest to the user. Such results, i.e., multimedia content items are displayed to the user through the display 120-4 and saved in the storage unit 120-3. In one embodiment, the DCC engine 120-5 can update cached concepts or create new concepts using the search results.

It should be noted that searching can be performed locally on the user device 120 to find relevant multimedia content data items. In one embodiment, the search-by-content as discussed above is initiated and performed by at least one application (not shown) executed by the processor 120-1. The application may be, for example, a web browser, a script, or any application of the user device 120 that is programmed to perform the embodiments disclosed above. The application includes instruction embodied on a computer readable medium, such as the memory 120-2.

In another embodiment, metadata and SRCs of matching concepts are sent to a server 160 connected to the network 110. The server 160 typically comprises a processing unit, such as a processor (not shown) or an array of a processor coupled to a memory (not shown). The memory contains instructions that can be executed by the processing unit. The server 160 also includes an interface (not shown) to the network 110.

According to this embodiment, the server 160 is configured to query the data sources 130 and the concept database 140 to retrieve search results that match the metadata and SRCs. The server 160 is also configured to retrieve the one or more user's characteristics stored in the data warehouse 150. Then, the server 160 filters results that do not coincide with the user's characteristics to detect results that are of interest to the user. Such results include, i.e., multimedia content items sent to the user device 120. For example, the user's characteristics may include the user's age, thus content items that are recognized as inappropriate for users of that age are not sent to the user device 120.

Figure 2:
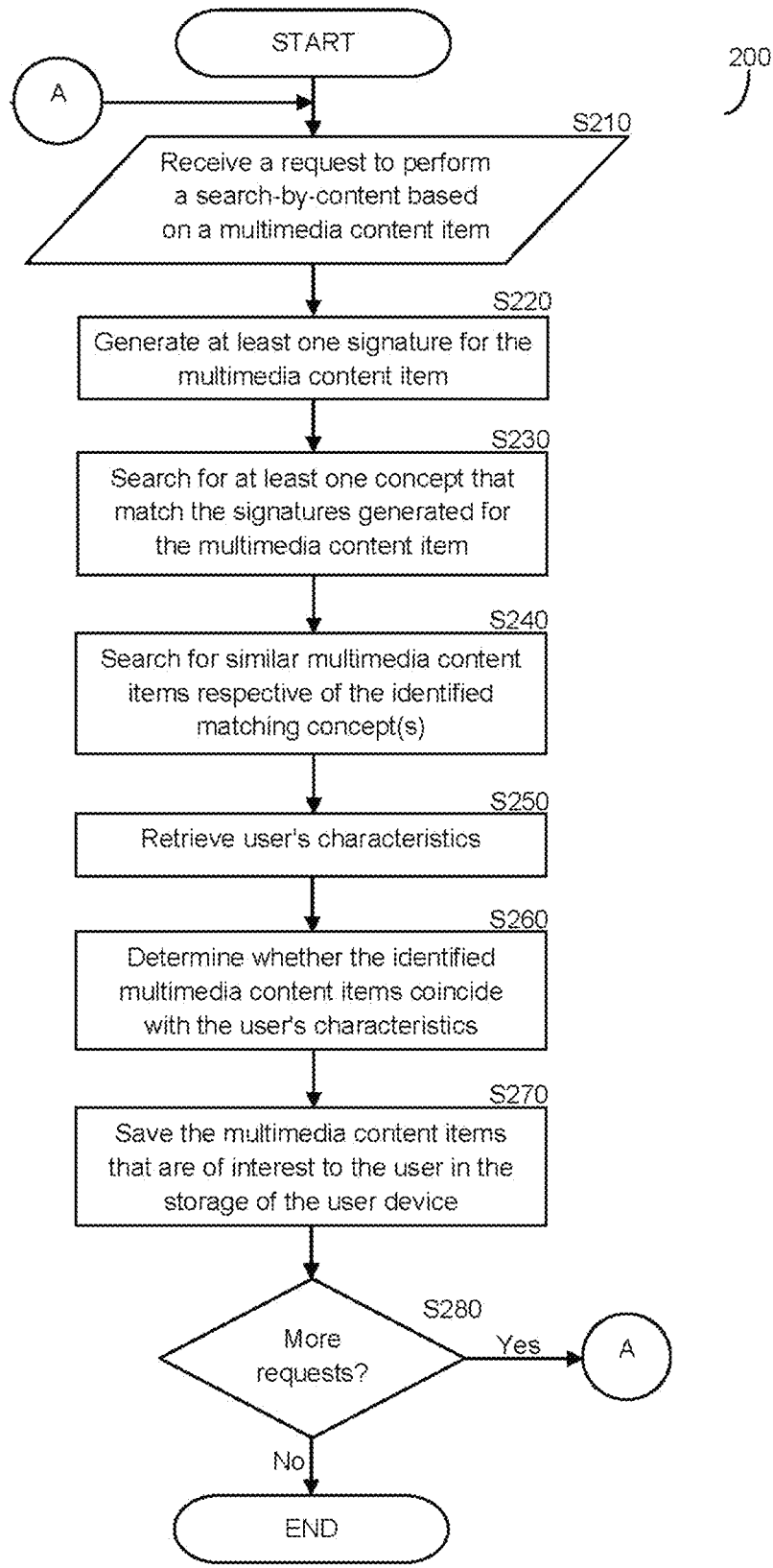
FIG. 2 is a flowchart describing a method for a content-based search according to one embodiment.

FIG. 2 shows an exemplary and non-limiting flowchart 200 describing a method for search-by-content according to one embodiment. In S210, a request to perform a search-by-content is received. Such a request may be in response to a multimedia content item displayed on the user device 120 or, alternatively, a multimedia content item uploaded to the user device 120.

In S220, at least one signature is generated by the SGS 120-6 for the received multimedia content item or portions thereof. In S230, an attempt is made to find at least one matching concept in the concepts locally cached in the user device 120. The matching is performed using the least one signature generated for at least one multimedia content item and the SRC of each concept cached in the user device 120. In an embodiment, at least one signature generated for a multimedia content item is matched against the SRC of each concept maintained by a DCC system, such as the DCC engine 120-5. If the SRC of the concept overlaps with the signature of the multimedia content item (or a portion of the item) more than a predetermined threshold level, a match exists. Various techniques for determining matching concepts are discussed in the '185 Patent. For each matching concept the respective SRC and metadata are returned.

In S240, the SRC and metadata of each matching concept are sent to a plurality of data sources 130-1 through 130-n and the concept database 140 to search for similar multimedia content items.

In S250, one or more characteristics of a user of the user device 120 are retrieved via the search-by-content. Such characteristics may include, for example, user interests, demographic information related to the user, and so on. The demographic information may be, but is not limited to, the age of the user, geographical location and time zone, the user's spoken language, and so on. The one or more user characteristics may be retrieved from the data warehouse 150 and/or received as an input by the user.

In S260, the search results, i.e., multimedia content items returned in response to the search performed in S240 are processed to determine if the results are of interest to the user. The determination is performed based on the user characteristics. In S270, multimedia content items that are of interest to the user are saved in the used device 120.

In S280 it is checked whether there are additional requests and if so execution continues with S210; otherwise, execution terminates. According to one embodiment, the method disclosed herein is performed by a user device, such as, user device 120. In another embodiment, a server such as, server 160 is configured to perform steps S240 through S270 under the instructions of the user device 120.

As a non-limiting example, a search-by-content is initiated using an input image of animals. The image matches concepts of "elephant", "zebra", and "tortoise". Based on the concepts, a search for similar content is performed. Characteristics of a user provide that the user is a minor located in Australia. Thus, the similar multimedia content items of Australian animals such as Kangaroos are returned to the user respective of the input image.

Figure 3:
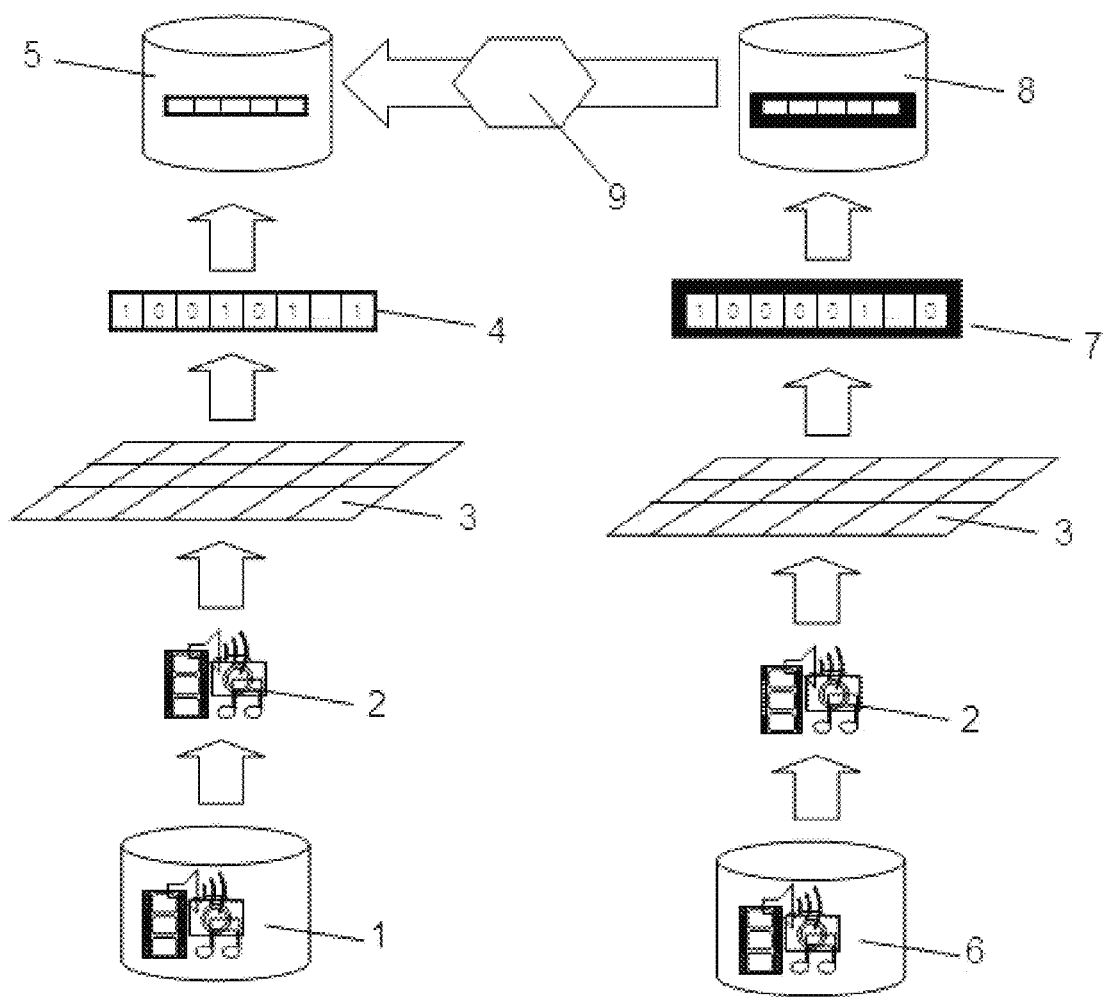
FIG. 3 is a block diagram depicting the basic flow of information in the signature generator system.
Figure 4:
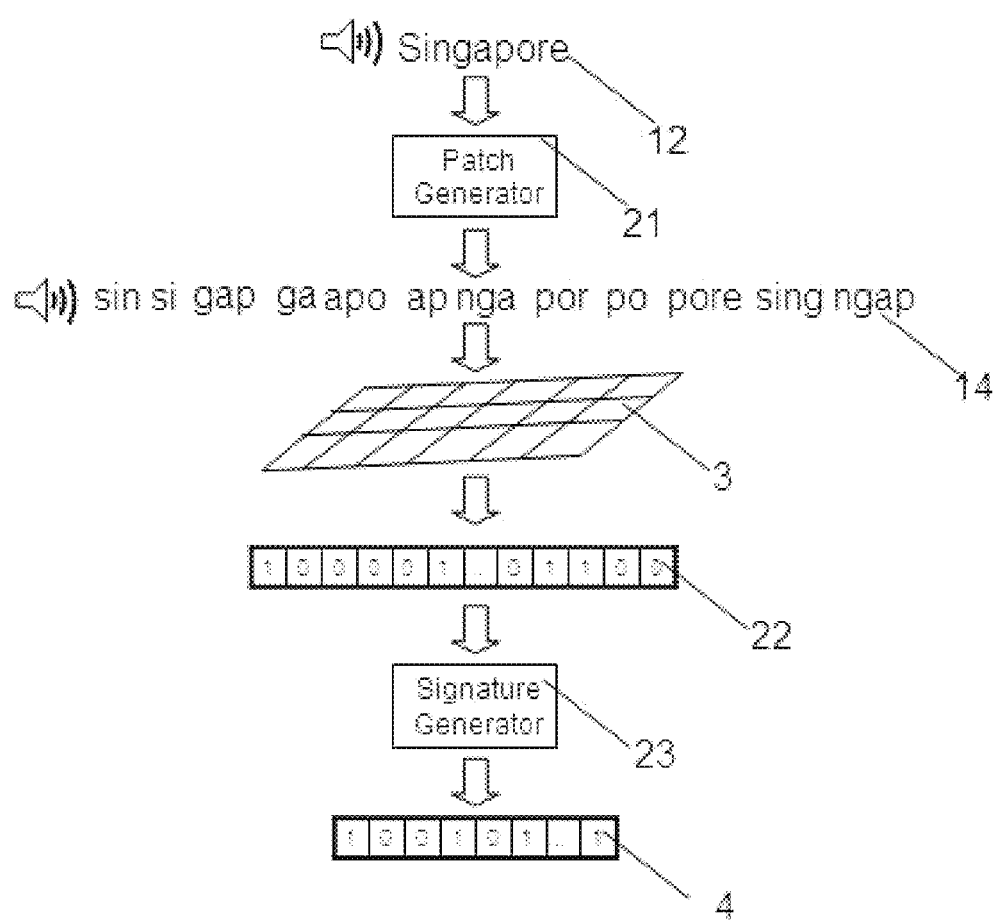
FIG. 4 is a diagram showing the flow of patches generation, response vector generation, and signature generation in a large-scale speech-to-text system.

FIGS. 3 and 4 illustrate the generation of signatures for the multimedia content items or portions of such items by the SGS, e.g., SGS 120-6 according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of a signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process will now be described with reference to FIG. 4. The first step in the process of signatures generation from a given speech-segment is to break down the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the SGS 120-6. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3, a frame T is injected into all the Cores 3. Then, Cores 3 generate two binary response vectors: $\vec{S}$, which is a Signature vector, and $\vec{RS}$, which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$$n_i = \Pi(V_i - Th_x)$$

where, $\Pi$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); Thx is a constant Threshold value, where x is 'S' for Signature and 'RS' for Robust Signature; and Vi is a Coupling Node Value.

The Threshold values Thx are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

1: For: $V_i > Th_{RS}$
   $1-p(V>Th_S)-1-(1-\epsilon)^l \ll 1$
   i.e., given that l nodes (cores) constitute a Robust Signature of a certain image l, the probability that not all of these l nodes will belong to the Signature of same, but noisy image, • is sufficiently low (according to a system's specified accuracy).

2: $p(V_i > Th_{RS}) \approx l/L$
   i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need to compare the another signature to the original data. The detailed description of the Signature generation is discussed in more detail in the co-pending patent applications of which this patent application is a continuation-in-part, and are hereby incorporated by reference.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for conducting search-by-content, comprising:
    responsive to an input multimedia content item provided to a user device,
    checking if the input multimedia content item matches at least one concept of a plurality of concepts cached in the user device, wherein the at least one matching concept is a collection of signatures representing a large scale of multimedia content items, the collection is of a signature reduced cluster generated by inter-matching signatures generated for the large scale of multimedia content items, and the at least one matching concept is represented using at least on signature and metadata;
    retrieving characteristics set for a user of the user device;
    performing a search, using the at least one matching concept, for multimedia content items similar to the input multimedia content item;
    determining which of the search results are of interest to the user based on the characteristics set for the user; and
    saving results that are of interest to the user in the user device, wherein the saved results include multimedia content items.

2. The method of claim 1, further comprising:
    generating at least one signature for the input multimedia content item prior to checking for at least one matching concept, wherein the at least one generated signature is robust to noise and distortion.

3. The method of claim 1, wherein the at least one concept is determined to match the multimedia content item when the at least one signature of a concept matches at least one signature generated for the multimedia content item over a predefined threshold.

4. The method of claim 3, wherein upon identification of at least one matching concept, the at least one signature and the metadata of the at least one matching concept are returned.

5. The method of claim 4, wherein performing the search using the at least one matching concept further comprising:
    querying a plurality of data sources using the at least one signature or the metadata of each of the at least one matching concept.

6. The method of claim 1, wherein the data sources include any one of: websites, data warehouses storing multimedia content items, and a concept database.

7. The method of claim 1, wherein the concept database indexes multimedia data items into concepts.

8. The method of claim 1, further comprising:
    checking, for each of the search results, if a search result coincides with one or more of the characteristics set for the user.

9. The method of claim 8, wherein the characteristics include content preferences of the user and demographic information related to the user.

10. The method of claim 1, wherein the cached concepts are created from multimedia content items locally saved in the user device.

11. The method of claim 1, wherein a multimedia content item is any one of: an image, a graphic, a video stream, a video clip, an audio stream, an audio clip, a video frame, a photograph, an image of signals, a combination thereof, and portions thereof.

12. A non-transitory computer readable medium having stored thereon instructions for causing one or more processing units to execute the method according to claim 1.

13. A method for search-by-content, comprising:
    responsive to an input multimedia content item provided to a user device,
    generating at least one signature for the input multimedia content item;
    checking if the input multimedia content item matches at least one concept of a plurality of concepts cached in the user device, wherein the at least one matching concept is a collection of signatures representing a large scale of multimedia content items, the collection is of a signature reduce cluster generated by the inter-matching signatures generated for the large scale of multimedia content items, and the at least one matching concept is represented using at least one signature and metadata;
    for each of the least one matching concepts, sending at least one signature and metadata of the matching concepts to a server configured to search for multimedia content items similar to the input multimedia content item; and
    saving results that are of interest to the user in the storage device, wherein the saved results include multimedia content items.

14. The method of claim 13, wherein the at least one concept is determined to match the multimedia content item when the at least one signature of the concept matches at least one signature generated for the multimedia content item over a predefined threshold.

15. A non-transitory computer readable medium having stored thereon instructions for causing one or more processing units to execute the method according to claim 13.

16. A system for conducting search-by-content, comprising:
    a processor;
    a deep content classification (DCC) engine connected to the processor;
    a storage unit for caching a plurality of concepts;
    a memory connected to the processor, wherein the memory contains instructions that, when executed by the processor, configure the system to:

responsive to an input multimedia content item provided to a user device, check, by the DCC engine, if the input multimedia content item matches at least one concept of the plurality of concepts cached in the storage unit;

retrieve characteristics set for a user of the user device;

perform a search for multimedia content items similar to the input multimedia content item using the at least one matching concept;

determine which of the search results are of interest to the user based on the characteristics set for the user; and save results that are of interest to the user in the storage unit, wherein the saved results include multimedia content items.

17. The system of claim 16, wherein the system further comprises a signature generator configured to generate least one signature for the input multimedia content item prior to the check performed by the DCC engine, wherein the at least one generated signature is robust to noise and distortion.

18. The system of claim 17, wherein the at least one matching concept is a collection of signatures representing a large scale of multimedia content items, the collection is of a signature reduced cluster generated by inter-matching signatures generated for the large scale of multimedia content items, and the at least one matching concept is represented using at least one signature and metadata.

19. The system of claim 18, wherein the at least one concept is determined to match the multimedia content item when the at least one signature of the at least one concept matches at least one signature generated for the multimedia content item over a predefined threshold.

20. The system of claim 19, wherein upon identification of at least one matching concept, the DCC engine is configured to return the at least one signature and the metadata of the at least one matching concept.

21. The system of claim 20, wherein the system is further configured to query a plurality of data sources using the at least one signature or the metadata of each of the at least one matching concept.

* * * * *